United States Patent

[11] 3,566,942

[72] Inventor Traver J. Smith
San Jose, Calif.
[21] Appl. No. 749,832
[22] Filed Aug. 2, 1968
[45] Patented Mar. 2, 1971
[73] Assignees Geneieve I. Hanscom
Saratoga, Calif.;
Geneieve I. Magnuson; Robert Magnuson; Los J. Thomson, trustees of the Estate of Roy M. Magnuson, a fractional part interest to each

[54] APPARATUS FOR PEELING VEGETABLES OR FRUITS
3 Claims, 3 Drawing Figs.
[52] U.S. Cl. .................................................. 146/49
[51] Int. Cl. .................................................. A23n 7/02
[50] Field of Search ...................................... 146/49.1, 49, 50

[56] References Cited
UNITED STATES PATENTS
1,995,693  3/1935  Urschel .................... 146/49.1
3,134,413  5/1964  Dorsa et al. ............... 146/49.1
FOREIGN PATENTS
270,835  5/1927  Great Britain ............... 146/49
591,022  1/1934  Germany .................... 146/49

Primary Examiner—Andrew R. Juhasz
Assistant Examiner—F. R. Bilinsky
Attorney—Allen and Chromy ABSTRACT: This invention provides a peeling cylinder whose peripheral wall is made up of abrasive peeling rolls and through the center of which a feed screw extends to progress material through for peeling. The rolls are all rotated at the same r.p.m. in speed but certain rolls are of smaller diameter to provide longitudinally extending recesses or pockets to provide both a lifting action on the material being peeled to increase the effective peeling time on this material, and also to provide a differential speed between adjacent rolls of different diameter so as to further enhance the peeling action.

PATENTED MAR 2 1971  3,566,942
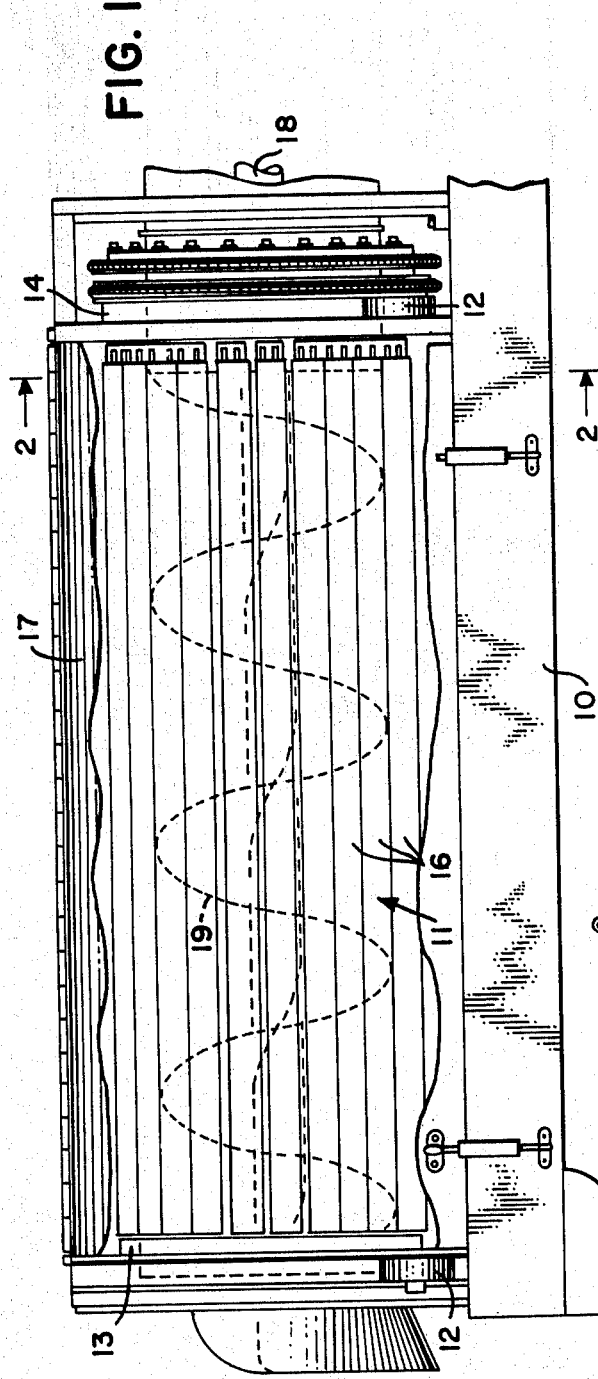
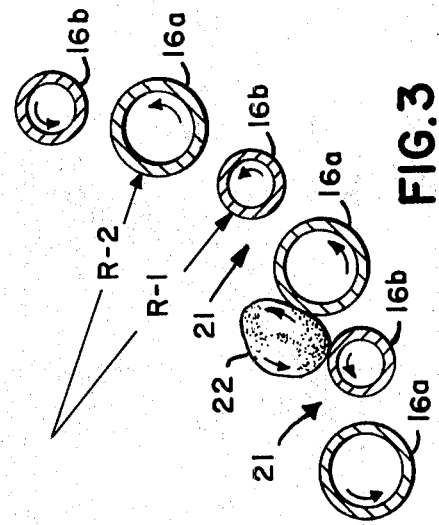
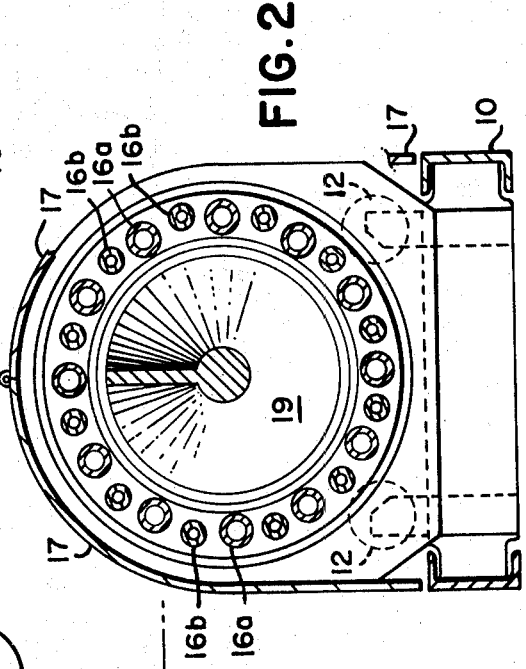
INVENTOR.
TRAVER J. SMITH
BY *Allen and Allen*
ATTORNEYS

APPARATUS FOR PEELING VEGETABLES OR FRUITS

DESCRIPTION OF THE INVENTION

The present invention relates to apparatus for peeling vegetables or fruits by abrasive methods and is concerned more particularly with improvements in such apparatus which will promote the peeling action, both by lengthening the peeling time and by providing an effective differential peeling action between certain adjacent rolls to enhance the amount and quality of the peeling.

The apparatus is of the general character disclosed in the patent to Dorsa et al. No. 3,143,413, issued May 26, 1964.

It is a general object of the present invention to provide an abrasive vegetable peeler wherein, in a peeling cylinder whose periphery is made up of peeling rolls, a longer peeling action is obtained by increasing the lift of the product during the travel up one side of the cylinder.

A further object of the invention is to provide a cylinder of the above character having peeling rolls forming its periphery wherein longitudinally extending recesses or pockets are provided to not only lift the material being peeled further up the wall of the peeling cylinder, but also to enhance the peeling action by obtaining a differential peeling effect between certain adjacent pairs of rolls which rotate at different peripheral speeds.

Other objects and advantages of the invention will be apparent from the following description of a preferred embodiment thereof, taken in connection with the accompanying drawings, in which:

FIG. 1 is a fragmentary side elevational view of the peeling apparatus embodying the invention;

Fig. 2 is a transverse sectional view taken in a plane indicated by the line 2-2 in FIG. 1;

FIG. 3 is a fragmentary schematic view generally similar to FIG. 2 but illustrating in greater detail the arrangement of the peeling rolls to obtain the longitudinal recesses and the differential peeling action.

Referring first to FIGS. 1 and 2, the peeling apparatus of the instant invention includes a frame 10 upon which e rotary drum 11 is mounted for rotation by means of a plurality of trunnion rollers 12 engaging respective end rings 13 and 14 of the drum 11 which have horizontally extending rolls 16 journaled therein to form the periphery of the drum or cylinder. Suitable tie bars (not shown) extend between the end rings 13 and 14. A suitable cover 17 is provided for the apparatus. The drum and the individual peeling rolls 16 are driven in a suitable fashion from a main shaft 18, as described in detail in said U.S. Pat. No. 3,134,413. A screw conveyor 19 is carried by the shaft 18 and serves to progress objects along through the abrasive cylinder formed by the peeling rolls 16 from right to left, as viewed in FIG. 1.

Reference is made to said U.S. Pat. No. 3,134,413 and to the pending application of Ralph K. Daugherty, Ser. No. 578,747, filed Sept. 12, 1966, for APPARATUS FOR PEELING VEGETABLES OR FRUITS, and now U.S. Pat. No. 3,437,116, for details of construction not specifically described herein.

Referring to FIGS. 1, 2 and 3, the peeling rolls 16 are journaled in the end rings 13 and 14, as previously described, and their axes lie on a common circle concentric with the axis of the cylinder, alternate rolls 16a and 16b being of different diameters but driven at the same number of revolutions per minute by a suitable ring gear. The rolls 16b, being of smaller diameter than the rolls 16a, have their working surfaces facing the center of the cylinder at a greater radial distance R-1 from the axis of the cylinder than the radial distance R-2 of the working surfaces of the rolls 16l (FIG. 3) so that a longitudinally extending recess or pocket 21 is provided adjacent each of the rolls 16b. While these pockets are defined as shown by a roll 16b between two rolls 16a, it is obvious that other combinations of varying diameters can be used to provide an axially extending or longitudinally extending pocket for lifting the material further up the ascending portion of the path along the peeling cylinder to obtain a longer peeling time. Also, the rolls 16a and 16b, being driven at the same number of revolutions per minute but having a different diameter, have a different peripheral speed so that between each pair of rolls 16a and 16b there is provided a differential peeling action on any material engaged therewith, such as the potato 22 shown in FIG. 3.

While I have shown and described a preferred form of the invention, it will be apparent that the invention can be varied and modified from the form shown so that the scope thereof should be limited only by the proper scope of the claims appended hereto.

I claim:

1. In an abrasive peeling machine, a frame, a cylinder mounted on said frame for rotation about a horizontal axis, the peripheral wall of said cylinder comprising a plurality of parallel horizontally disposed peeling rolls, each roll including a working surface disposed in facing relation to the axis of said cylinder, the radial distances of said working surfaces of certain of said rolls from said axis being different than the radial distances from said axis of the working surfaces of others of said rolls to provide longitudinally extending pockets or recesses in said peripheral wall to provide a lifting action on material being peeled, and means for driving said rolls to provide a differential surface speed between adjacent rolls having different radial spacings.

2. In an abrasive peeling machine as recited in claim 1 in which the axes of the rolls lie on the same circle concentric with the axis of the cylinder, and said rolls vary in diameter.

3. In an abrasive peeling machine as recited in claim 2 in which every other roll around the periphery forms a series of rolls of one diameter, and in which the other alternating rolls in said cylinder provide a series of rolls of a reduced diameter.